April 25, 1961     L. F. JILBERT     2,981,352
BATTERY HOLD DOWN DEVICE
Filed Nov. 5, 1957
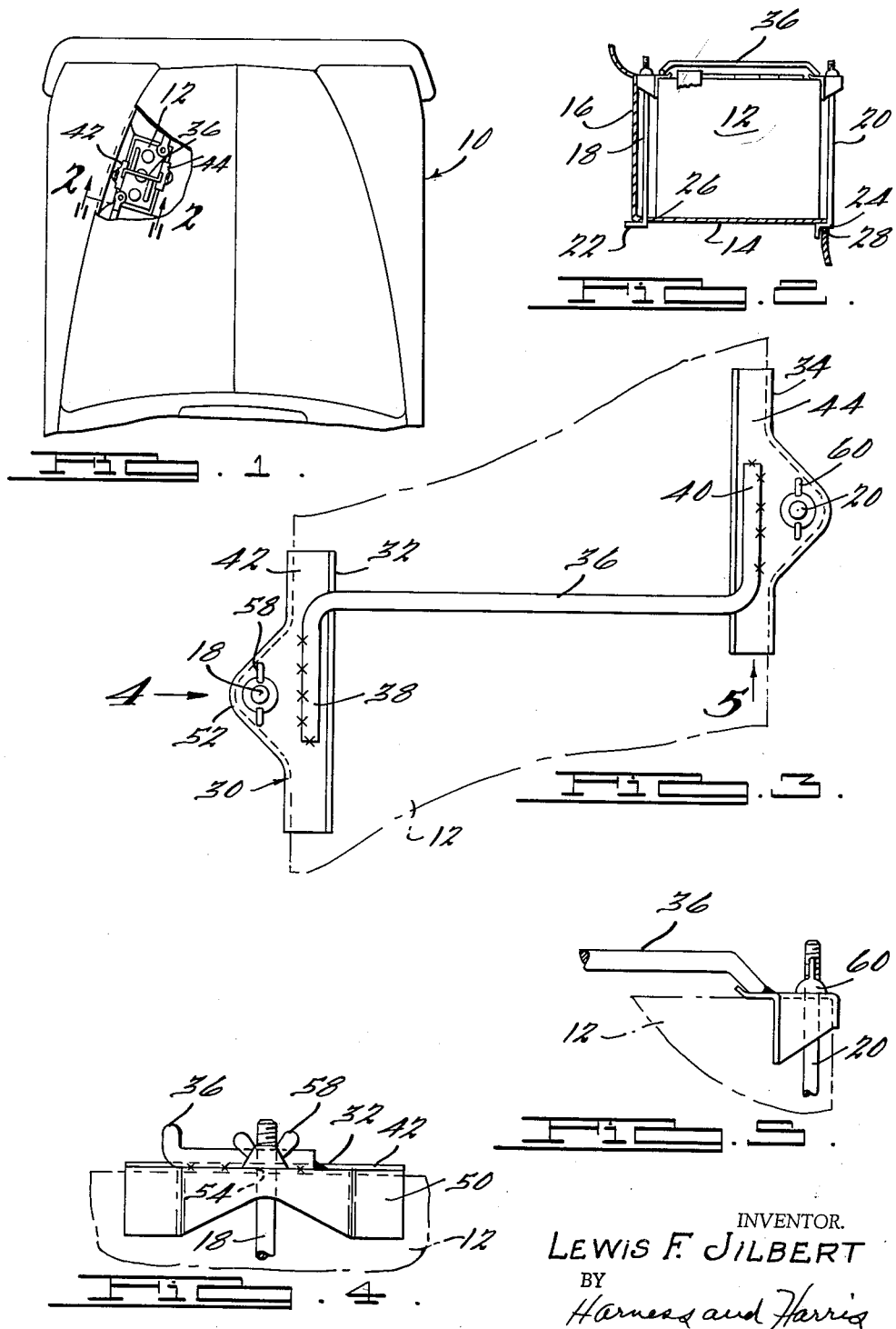
INVENTOR.
LEWIS F. JILBERT
BY
Harness and Harris
ATTORNEYS.

United States Patent Office 2,981,352
Patented Apr. 25, 1961

2,981,352
BATTERY HOLD DOWN DEVICE

Lewis F. Jilbert, Clawson, Mich., assignor to Chrysler Corporation, Highland Park, Mich., a corporation of Delaware Filed Nov. 5, 1957, Ser. No. 694,631
2 Claims. (Cl. 180—68.5)

The present invention relates to motor vehicles and has particular reference to vehicle batteries and the securing means therefor.

In the past, various types of devices have been used to secure a vehicle battery in place. In many cases these devices have been cumbersome, expensive and inadequate.

A principal object of the present invention is to provide an improved battery hold down device which is relatively more compact and of simpler construction than others known in the art.

Another object is to provide an improved battery hold down device which is easily as well as economically manufactured.

More particularly, the invention relates to a battery hold down device which includes a pair of side engaging brackets which are connected by a single rod which when in position on a battery extends transversely thereof. The side brackets are provided with openings to receive vertical rods to secure the device in place. The cross rod and side bracket assembly may be coated with insulating material. For example, the assembly may be dipped in a plastic or natural or synthetic rubber.

Other objects and advantages will become more apparent from the following description of the embodiments of the invention, reference being had to the accompanying drawings in which:

Fig. 1 is a plan view of a hood of a vehicle having a portion broken away to illustrate the invention.

Fig. 2 is a sectional view taken on the line 2—2 of Fig. 1.

Fig. 3 is an enlarged view of the hold down device shown in Fig. 1.

Fig. 4 is a side view taken in the direction of the arrow 4 in Fig. 3.

Fig. 5 is an end view taken in the direction of the arrow 5 shown in Fig. 3.

In Fig. 1, there is shown the front end of an automobile, generally designated by the numeral 10, wherein a portion is broken away and discloses a battery 12 mounted therein.

In Fig. 2, the battery is shown to be resting on a platform 14, which is formed from a depressed part of the inner sheet metal fender 16. In accordance with the invention, vertical support rods 18 and 20 have bent ends 22 and 24 which extend through and are held in openings 26 and 28 in the platform 14, respectively. The rods 18 and 20 extend vertically along the opposite longitudinal sides of the battery 12 and have their upper ends threaded to receive a battery hold down device generally designated by the numeral 30.

The battery hold down device 30 comprises oppositely disposed clamping members or brackets 32 and 34 which are secured together by a rod 36. The rod 36 has its ends 38 and 40 bent in opposite directions and secured to the upper faces 42 and 44 of the brackets 32 and 34 by welding or some other similar means, respectively. By this construction, the brackets 32 and 34 are offset relative to each other, as more clearly seen in Figs. 1 and 3.

The brackets 32 and 34 are identical in construction and, therefore, it is believed that a description of one will suffice for both. The bracket 32 is a stamped sheet metal member and comprises the upper face 42, which is adapted to engage the upper edge of the longitudinal side of the battery. The face 42 is integrally connected to a side face 50, which is adapted to engage the upper side edge of the battery. In order to accommodate securement, the bracket 32 during its formation has its upper face 42 and its side face 50 deflected outwardly to form a substantially U-shaped extension 52 which is provided with an opening 54 to receive the upper threaded end of the vertical support rod 18. The bracket 34 is similarly constructed and receives the upper threaded end of the vertical support rod 20 through the opening therein.

By this construction the perpendicular distance between the engaging faces of the brackets 32 and 34 is predetermined to be substantially the width of the battery so that when the hold down device 30 is placed over the battery, as seen in Fig. 1, the side and top faces of the brackets engage the top and side faces of the battery. To hold the device 30 in position, wing nuts 58 and 60 are threaded on the upper ends of the support rods 18 and 20 and are turned down until they engage the upper faces of the brackets 32 and 34 to thereby hold the battery securely in position.

By utilizing this improved device, it will be seen that a very simple and compact structure is utilized to hold the battery in position. This device is particularly advantageous in that there is no continuous band extending around the battery. The continuous band type of construction is particularly offensive in view of the fact it is often extremely hard to get off of the battery when it is necessary to remove the latter. The actual contacting surface of the hold down device is restricted to the engaging surfaces of the brackets 32 and 34.

On some installations it has been found advisable to insulate the hold down device 30 from the battery and in accordance with the invention, therefore, the hold down device 30, as more particularly shown in Fig. 3, is conveniently dipped into a plastic, rubber or synthetic rubber compound, which thereby forms an insulating coating around the entire hold down structure.

While I have illustrated and described but one embodiment of the invention, it is to be understood that such is for the purpose of illustration only, and it is contemplated that those skilled in the art may modify certain details without departing from the spirit or scope of the invention as defined in the claims appended hereto.

What is claimed is:

1. A device adapted to hold down a battery of generally box-like configuration having protrusions extending upwardly from the top surface of said battery, comprising first and second brackets of L-shaped cross sectional configuration engageable with opposite edges of said battery, wherein each bracket has an upper surface engageable with a portion of the upper surface of said battery, and a rod having elongated, angularly offset end portions secured lengthwise of the upper surfaces of said brackets and an intermediate portion adapted to extend across the upper surface of said battery, said intermediate portion being raised relative to the upper surface of said brackets to facilitate clearance with respect to the protrusions on the upper surface of said battery.

2. A device adapted to hold down a battery of generally box-like configuration having protrusions extending upwardly from the top surface of said battery, comprising first and second brackets engageable with opposite edges of said battery wherein each bracket has an upper surface engageable with a portion of the upper surface of said battery, and a rod adapted to extend across said battery, said rod having an intermediate section bridging said battery and oppositely disposed end portions bent at substantially right angles to said intermediate portion, said end portions extending lengthwise of and being fixed to said brackets substantially along the entire length of the end portions and said intermediate section being raised relative to the upper surfaces of said brackets to facilitate clearance with respect to the protrusions on the upper surface of said battery.

References Cited in the file of this patent

UNITED STATES PATENTS

| 1,705,381 | Snyder | Mar. 12, 1929 |
| 2,094,329 | Mascuch | Sept. 28, 1937 |
| 2,613,755 | Newby | Oct. 14, 1952 |
| 2,657,756 | Brogren | Nov. 3, 1953 |
| 2,710,660 | Coleman | June 14, 1955 |
| 2,849,074 | Key et al. | Aug. 26, 1958 |
| 2,853,143 | Bergman | Sept. 23, 1958 |